G. W. RIGNEY & S. J. HANLIN.
BRAKE HANDLE.
APPLICATION FILED NOV. 13, 1908.
934,935.
Patented Sept. 21, 1909.
2 SHEETS—SHEET 1.
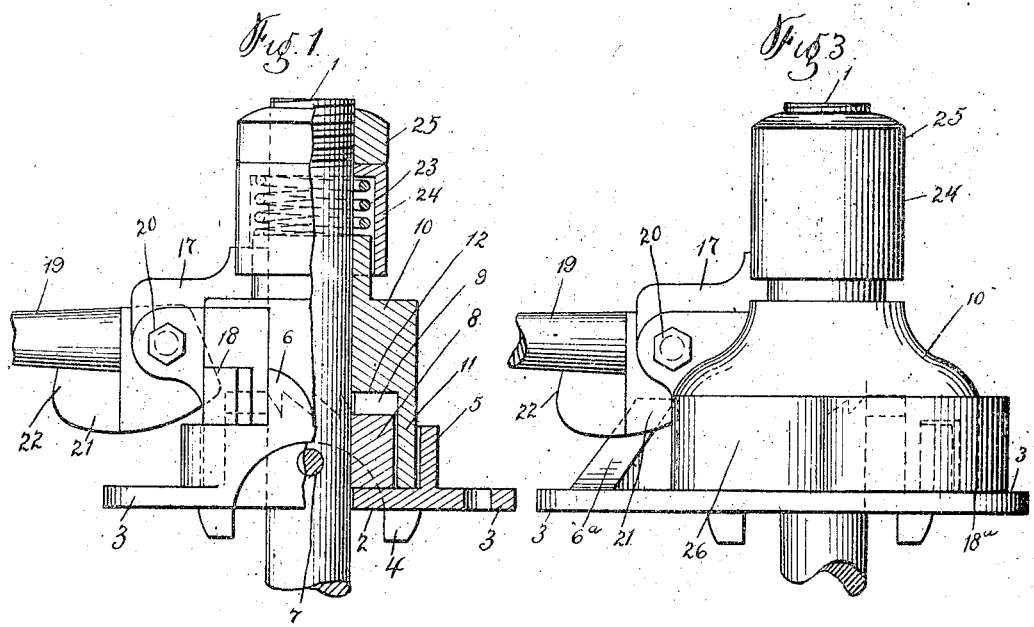
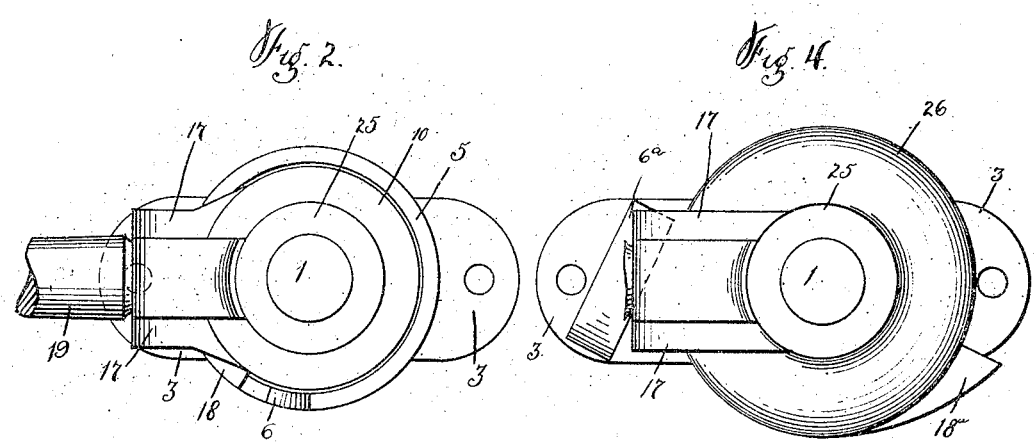
Witnesses
Samuel Payne
N. H. Butler
Inventors
G. W. Rigney
S. J. Hanlin
By H. C. Evert & Co.
Attorneys

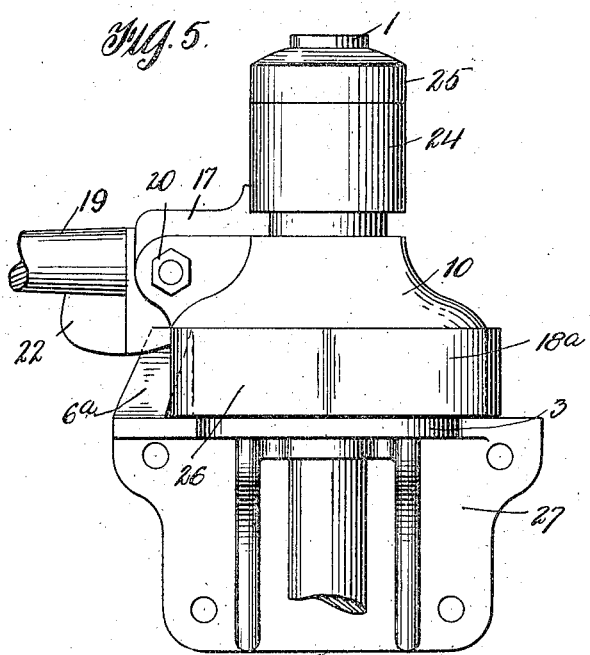
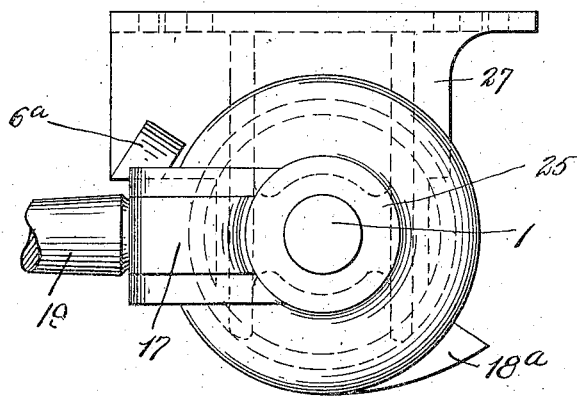

UNITED STATES PATENT OFFICE.

GEORGE W. RIGNEY AND STEWART J. HANLIN, OF PITTSBURG, PENNSYLVANIA.

BRAKE-HANDLE.

934,935.

Specification of Letters Patent. Patented Sept. 21, 1909.

Application filed November 13, 1908. Serial No. 462,510.

*To all whom it may concern:*

Be it known that we, GEORGE W. RIGNEY and STEWART J. HANLIN, citizens of the United States of America, residing at Pittsburg, in the county of Allegheny and State of Pennsylvania, have invented certain new and useful Improvements in Brake-Handles, of which the following is a specification, reference being had therein to the accompanying drawing.

This invention relates to brake handles, and more particularly to certain improvements on Patent No. 898,880 for improvements in brake handles granted to us Sept. 15, 1908, and Patent No. 838,249 for improvements in brake handles granted to Stewart J. Hanlin, Dec. 11, 1906.

The object of the present invention is to provide positive and reliable means for limiting the movement of a brake handle and preventing the handle from injuring or damaging the operator or structures in the vicinity of the same.

In the above mentioned patents, it was the object to provide a pivoted brake handle with a ratchet mechanism to assist the brakeman in applying the brakes, the brake handle being moved in a plane parallel with the brake staff, thereby not interfering with passengers passing on or off of the platform of a car.

In the use of devices such as are shown in the above mentioned patents, trouble has been experienced by operator accidentally releasing the brake handle and thereby injuring rolling stock, besides narrowly escaping personal injury. It is in view of such negligence on the part of the operator in not properly manipulating the brake handle that we have devised the present invention, which prevents the release of the brakes from suddenly swinging the brake handle beyond a certain limit, the limit being such, that whether the brake handle is carried by the end of a car, on a support provided therefor, the brake handle will be prevented from injuring the car or operator or persons in proximity to the handle.

Our invention will be described in detail and then specifically pointed out in the appended claims.

Referring to the drawings forming a part of this specification Figure 1 is a side elevation of our brake handle, partly broken away and partly in section illustrating the same designed for a car railing, Fig. 2 is a plan of the same, Fig. 3 is a side elevation of a modified form of construction in connection with the brake handle, Fig. 4 is a plan of the same, Fig. 5 is a side elevation of a brake handle as designed for the side or end of a car, and Fig. 6 is a plan of the same.

The brake handles used in connection with passenger and Pullman cars are located at the platforms or the cars and in connection with an ordinary coach, the brake-staff extends upwardly through the railing of the platform, while in connection with vestibule and Pullman cars, the brake-staff extends upwardly through a bracket or similar support, either carried by the end of the vestibule or the end of the car.

In connection with the brake-staff, a drop handle and a ratchet mechanism is used, whereby when the brake handle is elevated to a horizontal position, it can be used as a lever in connection with the ratchet mechanism for imparting a rotary movement to the brake-staff. In conjunction with the brake-staff, a ratchet wheel and pivoted dog are used above the platform of a car, for holding the brake-staff after the brakes are set.

In applying the brakes, a pivoted dog is manipulated by the foot of the operator and very often the operator allows the brakestaff to slip without having the dog in engagement with the ratchet wheel carried by the brake-staff. Consequently, the vestibule of a coach or Pullman car is injured, glass is broken, and the life of the operator or passengers passing back and forth between the cars, is endangered. Whether our brake handle is used in the vestibule or upon the railing of a car, we have devised means for limiting the movement of the brake handle when in a horizontal position.

In the drawings, 1 Figs. 1 to 4 designates the upper end of a brake-staff extending through a base plate 2, having diametrically opposed apertured lugs 3 adapted to be secured to the railing of a car. To further assist in retaining the plate upon the railing, said plate is provided with depending lugs 4, for embracing the sides of a railing and correctly positioning said plate thereon. The plate is provided with a collar 5 having an upwardly extending stop lug 6. Mounted upon the staff 1 within the collar 5, by means of the pin 7, is a ratchet member 8 having the upper face thereof provided with circumferentially arranged ratchet teeth 9.

Revolubly mounted upon the staff 1 is a movable sleeve 10, said sleeve having an annular depending flange 11 surrounding the ratchet member 8 within the collar 5. The sleeve 10 is formed with interior circumferentially arranged ratchet teeth 12 adapted to normally engage the ratchet teeth 9 of the member 8. One side of the sleeve 10 is formed with a housing 17 provided with an exterior lug 18 adapted to engage the stop lug 6 and limit the movement of the brake-handle 19 pivotally mounted in the housing 17 on a pin 20. The pivoted end of the handle 19 is provided with a beveled lug 21 forming a shoulder 22 adapted to rest upon the collar 5 when the handle is in an inoperative position. The ratchet teeth 12 of the sleeve 10 are normally held in engagement with the ratchet teeth 9 of the member 8 by a coil spring 23, encircling the staff 1 and resting upon the upper end of the sleeve 10. The spring 23 is encased by a cap 24, which is cut away to provide clearance for the housing 17. The cap 24 is retained upon the upper end of the staff 1 by a nut 25 screwed thereon. To rotate the staff 1, the handle 19 is operated similar to an ordinary ratchet lever, the handle being first swung to a horizontal position, to allow the ratchet teeth 12 of the sleeve 10 to engage the ratchet teeth 9 of the member 8. The handle 19 is then moved back and forth, and at each retractile stroke of the handle, the sleeve 10 recedes to obtain a fresh grip upon the member 8. It will, of course, be understood that during this operation, the pawl located upon the car platform for engagement with the ratchet (not shown) carried by the brake staff is controlled by the foot of the operator, to prevent a backward rotation of the staff 1 and the sleeve 10 while a fresh grip is being taken by said sleeve.

During the operation of applying the brakes, should the handle 19 slip from the grip of the operator, the lug 18 engaging the stop lug 6 will prevent said handle from swinging and injuring the operator, the lugs 18 and 6 being located so as to protect the operator. With the handle 19 in a lowered position, and the shoulder 22 resting upon the collar 5, the spring 23 is retained under tension, but immediately lowers the sleeve 10 when the handle 19 is raised. As the brake-staffs and brake-handles are subjected to the weather elements when used on a freight car, it is preferable when the device is so used to provide the sleeve 10 with an additional depending flange 26. this flange surrounding the collar 5 and protecting the ratchet mechanism, whereby water, ice, or any foreign matter cannot interfere with the operation of the brake handle. See Figs. 3 and 4.

In the construction involving the additional depending flange 26, the stop lugs for limiting movement of the brake-handle are arranged, the lug designated in Figs. 3 and 4 as 6ª being located on one of the apertured lugs 3, while lug designated 18ª is carried by the depending flange 26. The flange 26 is cut away to provide clearance for the beveled edge 21 of the handle 19, whereby the shoulder 22 thereof can easily rest upon the collar 5.

In Figs. 5 and 6 of the drawings, the application of the brake handle, on the vestibule or end of a car is shown, in this instance a bracket 27 being carried by the base plate 3, for supporting the drop handle and its appurtenant parts. The bracket in this instance is provided with the lug 6ª, and the depending flange 26 carries the lug 18ª.

It will be observed, upon inspection of the above mentioned patents that our improvement consists in providing the stationary and movable lugs for limiting the movement of the brake handle, and in providing the depending flange 26, these elements being essential to insure a safe operation of the brake handle, and prevent the handle from being rendered inoperative by foreign matter.

Having now described our invention, what we claim as new, is,—

1. In a brake handle, the combination with a base plate, and a brake-staff extending there through, of a collar carried by said base plate, a toothed member arranged within said collar and fixed to said staff, a movable spring pressed sleeve mounted upon said staff and having teeth for engaging said toothed member, depending flanges carried by said sleeve for embracing said member and said collar, a lug carried by the outermost flange, a housing carried by said sleeve, a handle pivotally mounted in said housing and adapted to support said sleeve in an elevated position, a cap mounted upon the upper end of said sleeve, and a lug carried by said base plate and adapted to be engaged by the first mentioned lug for limiting the lateral movement of said handle.

2. In a brake handle, the combination with a base plate, and a brake-staff extending there through, a collar carried by said base plate, a toothed member arranged within said collar and fixed to said staff, a movable sleeve mounted upon said staff and having teeth for engaging said toothed member, depending flanges carried by said sleeve for embracing said member, and said collar, a lug carried by the outermost flange, a housing carried by said sleeve, a handle pivotally mounted in said housing and adapted to support said sleeve in an elevated position, and a lug carried by said base plate and adapted to be engaged by the first mentioned lug for limiting the lateral movement of said handle.

3. In a brake handle, the combination with a brake staff, of a stationary collar surrounding said staff, a toothed member arranged in said collar and fixed to said staff, a movable sleeve mounted upon said staff and having teeth for engaging said toothed member, depending flanges carried by said sleeve for embracing said member and said collar, a housing carried by said sleeve, a handle pivotally mounted in said housing and adapted to support said sleeve in an elevated position, and means adjacent to the outer depending flange of said sleeve for limiting lateral movement of said handle.

4. A brake operating device, comprising a base-plate, provided on its outer face with a collar, a brake-staff extending through the base-plate within said collar and fixed to said brake-staff, a ratchet sleeve slidably mounted on the brake-staff and having a depending annular sleeve received between the ratchet member and said collar, a brake-handle pivotally secured to said sleeve and having a lug for engagement with said collar, and means for limiting the lateral movement imparted to the brake-handle.

5. In a brake-operating device, the combination with a brake-staff, of a base-plate through which said staff extends, a collar carried by the outer face of said base-plate, a ratchet-member fixed to the brake-staff and inclosed by said collar a ratchet-sleeve slidably-mounted on the brake-staff and having a depending flange received between said ratchet member and the collar on said base-plate, a housing carried by said sleeve, a brake-handle pivotally mounted in said housing and having a lug provided with a shoulder for engagement with the said collar when the handle is in a vertical position and thereby hold the ratchet sleeve disengaged from the ratchet member, and means for limiting the lateral movement of said brake-handle.

6. In a brake-operating mechanism, the combination with a brake-staff, and a base-plate through which the shaft extends, of ratchet mechanism for moving the brake-staff in one direction, a handle pivotally-connected to the ratchet mechanism for actuating the same, said handle mounted to move from a horizontal to a vertical position and adapted when in the vertical position to hold the ratchet mechanism in inoperative position, and a pair of stop lugs arranged to limit the throw of the handle when the latter is in the horizontal operative position.

In testimony whereof we affix our signatures in the presence of two witnesses.

GEORGE W. RIGNEY.
STEWART J. HANLIN.

Witnesses:
MAX H. SROLOVITZ,
K. H. BUTLER.